M. E. RUDASILL.
Stalk-Chopper.

No. 30,501.    Patented Oct. 23, 1860.

Witnesses:
C. M. Alexander
A. A. Yeatman

Inventor:
M. E. Rudasill

UNITED STATES PATENT OFFICE.

MICHAEL E. RUDASILL, OF SHELBY, NORTH CAROLINA.

IMPROVEMENT IN MACHINES FOR CUTTING STALKS, &c.

Specification forming part of Letters Patent No. 30,501, dated October 23, 1860.

*To all whom it may concern:*

Be it known that I, M. E. RUDASILL, of Shelby, in the county of Cleveland and State of North Carolina, have invented certain new and useful Improvements in Machines for Cutting Cotton-Stalks and Weeds, &c.; and I do hereby declare that the following is a full, clear, and exact description of the same, reference being had to the accompanying drawings, and to the letters of reference marked thereon.

The nature of my invention consists in the use of the revolving cutter in connection with the stationary frame provided with knives, as will be hereinafter set forth.

Figure 3:
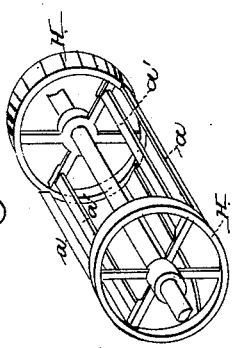
Figure 1:
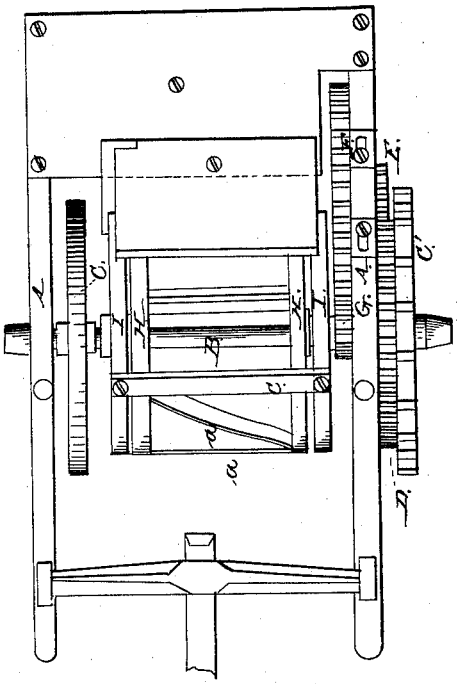
Figure 2:
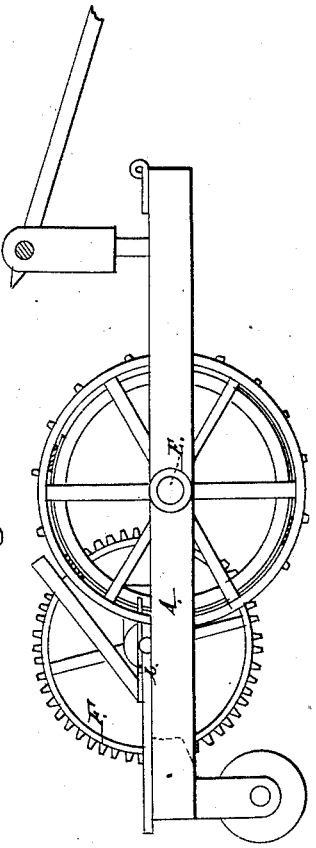

In the annexed drawings, Figure 1 represents a plan view. Fig. 2 is a side elevation. Fig. 3 is a perspective of the revolving cutters.

In the annexed figures, A A represent the frame of the machine, which is made of any suitable size and in a strong and substantial manner.

B represents a stationary axle, which is secured to the frame A, and upon which said frame rests. Two wheels, C C', are secured upon the axle B, so as to turn loosely upon it. Upon the axle B are also secured two reels, one of which is stationary while the other revolves. These reels consist of disks or rims placed a short distance apart and connected by means of knives secured to them. The stationary reel is composed of the rims I I, which are connected by means of the knives $c\ c$, and the revolving reel is composed of the disks or rims H H, which are connected, as represented, by means of the knives $a\ a$. One of these reels is smaller that the other, as seen, and revolves within it, being revolved by gear-wheels, as will be described.

D represents a large cog-wheel, which is attached to the side of wheel C'. Said wheel D gears into a pinion, E'. The pinion E is secured to one end of a short shaft, which has its bearing in one portion of the frame A. To the other end of said shaft is secured a cog-wheel, F, which gears into a pinion, G, which is secured to the inner reel, and which revolves loosely upon the shaft B. When the machine is set in motion the wheels C C' revolve, and the connecting gear-wheels, set in motion by means of the wheel C', convey and communicate motion to the inner reel and cause it to revolve very rapidly. In its forward motion the machine comes in contact with the stalks of cotton or corn, or whatever is in its way, and the knives upon the revolving reel strike the stalks and cut them down or draw them in between the two reels, where they are cut by both sets of knives, or by either. $i$ represents a little catch, which enters notches or grooves cut in one of the rims I, and is for the purpose of stationing the said rim at any desired point. The catch may be removed and the rims turned so as to change the position of the knives. Said catch may then be made to hold the rim at the desired position by causing it to enter the notches upon the rim.

Having thus fully described my invention, what I claim as new, and desire to secure by Letters Patent, is—

The employment of the revolving reel, composed of the rims or disks H H and knives $a\ a$, in combination with the stationary reel, composed of the rims I I and knives $c\ c\ c$, the same being arranged and used substantially as and for the purpose herein specified.

M. E. RUDASILL.

Witnesses:
C. M. ALEXANDER,
A. A. YEATMAN.